United States Patent [19]
Lex et al.

[11] Patent Number: 5,650,239
[45] Date of Patent: Jul. 22, 1997

[54] METHOD OF ELECTRODE RECONDITIONING

[75] Inventors: Peter J. Lex, Wauwatosa; Joseph F. Mathews, Shorewood; Phillip A. Eidler, Muskego, all of Wis.

[73] Assignee: ZBB Technologies, Inc., Wauwatosa, Wis.

[21] Appl. No.: 475,947

[22] Filed: Jun. 7, 1995

[51] Int. Cl.$^6$ .................................................. H01M 10/42
[52] U.S. Cl. .............................. 429/49; 429/50; 429/101; 429/105
[58] Field of Search .......................... 429/49, 101, 105, 429/50

[56] References Cited

U.S. PATENT DOCUMENTS

| | | | |
|---|---|---|---|
| 990,661 | 4/1911 | Luckow | 429/49 |
| 1,190,879 | 7/1916 | Emanuel. | |
| 2,571,754 | 7/1951 | Perkins. | |
| 4,691,158 | 9/1987 | Hashimoto et al. | 320/14 |
| 4,731,573 | 3/1988 | Sexton et al. | 320/14 |
| 4,950,378 | 8/1990 | Nagata | 204/402 |
| 5,135,820 | 8/1992 | Jones | 429/49 |
| 5,288,387 | 2/1994 | Ito et al. | 204/402 |
| 5,302,472 | 4/1994 | Ando et al. | 429/50 |
| 5,308,713 | 5/1994 | Mayer et al. | 429/49 |

OTHER PUBLICATIONS

Ford, "Classical and Modern Physics", vol. 3, Xerox College Publishing, p. A6 (no month).

Primary Examiner—Prince Willis, Jr.
Assistant Examiner—Carol Chaney
Attorney, Agent, or Firm—Godfrey & Kahn, S.C.

[57] ABSTRACT

A method of restoring electrochemical activity to an electrode of a battery. The battery is a bipolar, electrochemical flow battery including a predetermined number of electrochemical cells and an electrolyte. The method includes reversing the direction of the normal cycling current through the battery, and may include lowering the pH of the electrolyte in the battery.

12 Claims, 7 Drawing Sheets

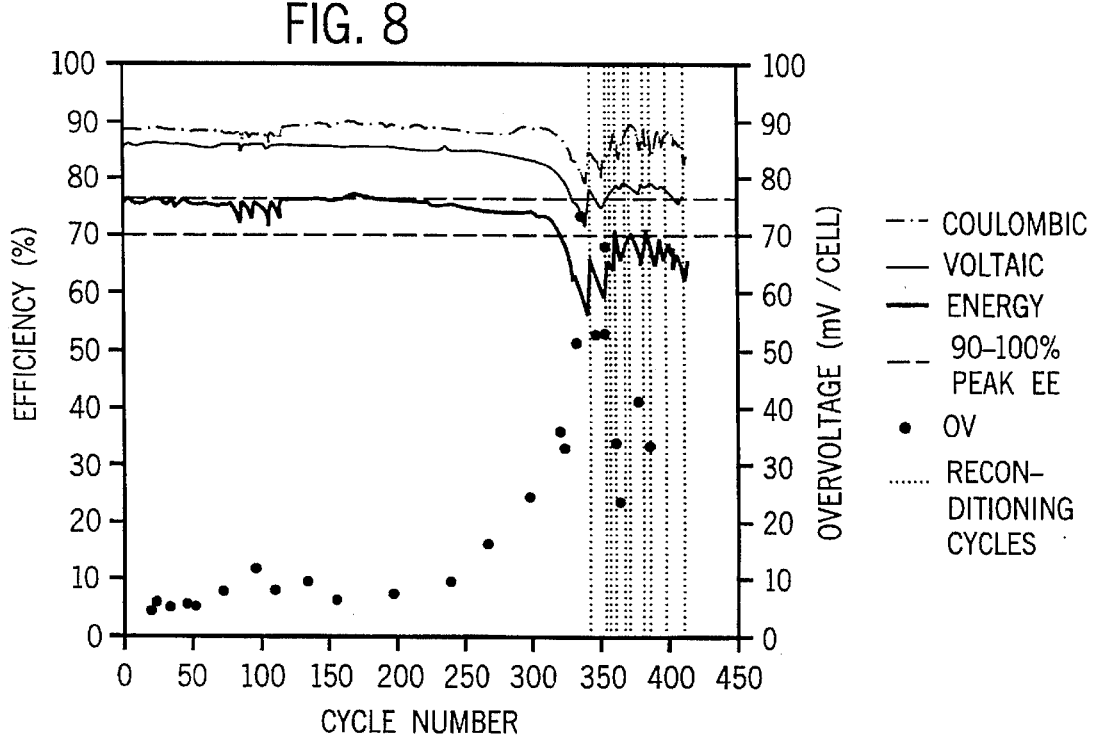
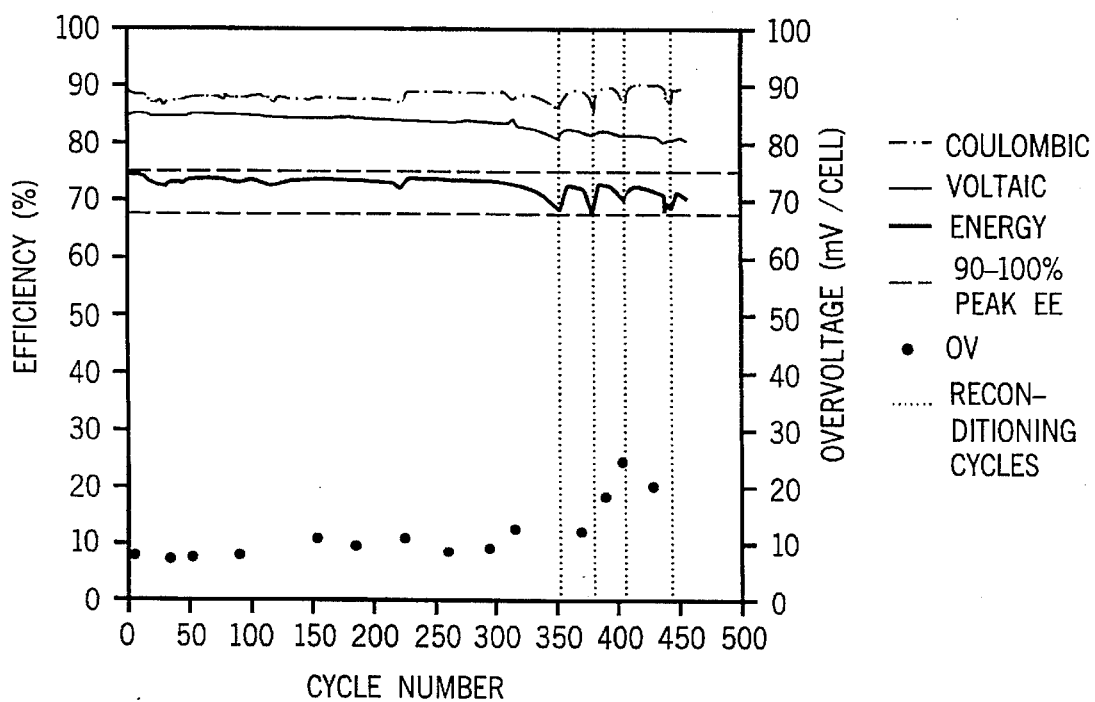

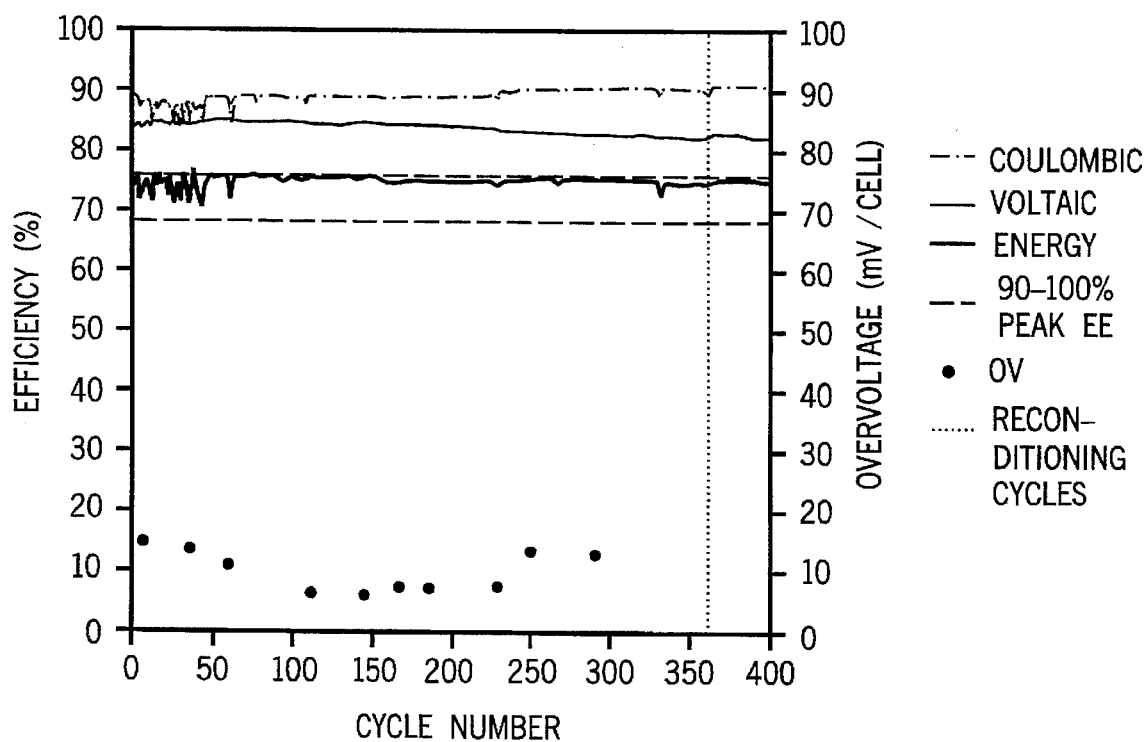

METHOD OF ELECTRODE RECONDITIONING

BACKGROUND OF THE INVENTION

1. Field of the Invention.

The present invention relates to zinc-bromine batteries. More particularly, the present invention relates to a method of restoring activity to the electrodes within a zinc-bromine battery.

2. Description of the Prior Art.

A zinc-bromine battery is a type of bipolar, electrochemical flow battery. As with all batteries, a zinc-bromine battery is capable of collecting and discharging electric charge. A zinc-bromine battery typically includes a series or stack of voltaic cells, a pump for pumping electrolyte through the cells, terminal electrodes electrically coupled to the stack of cells, and stud terminals electrically coupled to the terminal electrodes and through which electric charge flows into and out of the battery.

The battery cells are made up of a series of alternating electrodes and separators. The electrodes are said to be "bipolar" because an anodic reaction takes place on one side of the electrode and a cathodic reaction takes place on its opposite side. Therefore, each cell can be considered as having an anodic half-cell and a cathodic half-cell. An ion permeable separator separates the anodic half-cell from the cathodic half-cell. Electrolyte is pumped through each half-cell; an anolyte through the anodic half-cell, and a catholyte through the anodic half-cell.

The electrolyte in zinc-bromine batteries is an aqueous solution of zinc-bromide and quaternary ammonium salts, for example, methylethylpyrrolidinium bromide, with optional supporting salts, such as $NH_4Cl$, and it is circulated through the individual cells from external reservoirs. It should be understood that the battery may be in several states including a discharged state and a charged state.

In the discharged state, the anolyte is substantially chemically identical to the catholyte. During the process of collecting a charge, the following chemical reaction takes place:

$$Zn^{++} + 2\ e^- \rightarrow Zn$$

$$2\ Br^- \rightarrow Br_2 + 2\ e^-$$

Zinc is plated on the anode, and bromine is produced at the cathode. The bromine is immediately complexed by the quaternary ammonium ions in the electrolyte to form a dense second phase which is subsequently removed from the battery stack with the flowing electrolyte. Further, and when the battery is charged, zinc in stored on one side of each electrode and the complex bromine is stored in the catholyte reservoir.

During the electrical discharge process, the following chemical reaction takes place.

$$Br_2 + 2\ e^- \rightarrow 2\ Br^-$$

$$Zn \rightarrow Zn^{++} + 2\ e^-$$

In this reaction, zinc is oxidized, and the released electrons pass through the electrode where they combine with molecular bromine to form bromide ions. Further, the positively charged zinc ions travel through the separator and remain in solution, and at the same time, bromide ions pass through the separator in the opposite direction and remain in solution.

Zinc-bromine batteries have several advantages over other types of batteries. In particular, one such advantage is the relatively high energy storage capacity of a zinc-bromine battery. Even though zinc-bromine batteries are in many ways superior to other types of batteries, they are not completely satisfactory. One problem in present zinc-bromine batteries is that the zinc-zinc ion and bromine-bromide reactions take place at different rates on the electrodes within the battery. The bromine-bromide reaction is relatively slow. The differential between the rates of reaction in the battery causes polarization which eventually causes battery failure. Polarization is a measure of internal voltage loss that occurs during discharge and charge of the battery.

One method of increasing the rate at which the bromine-bromide reaction takes place is to apply a high-surface-area carbon coating on the cathodic side of each electrode of a zinc-bromine battery. However, over time the rate at which the bromine-bromide reaction takes place on the carbon coated electrode decreases. In particular, over time the active surface area of the carbon coating decreases. In addition, oxidation of the carbon coating may occur. Therefore, present carbon coating techniques provide only a limited solution to the problems associated with the rate at which the bromine-bromide reaction occurs in a zinc-bromine battery.

What is needed, therefore, is a method to restore the activity to an electrode of a zinc-bromine battery. Further, what is needed is a method to restore the activity of an electrode of a zinc-bromine battery which will increase the performance and life expectancy of a zinc-bromine battery. More specifically, what is needed is a method to restore the activity of a bromine electrode, or the cathodic side of a bipolar electrode, of a zinc-bromine battery.

OBJECTS AND SUMMARY OF THE INVENTION

Therefore, it is an object of the present invention to provide a method to restore the activity of an electrode of a zinc-bromine battery.

A further object of the present invention is to provide a method to restore the activity of a bromine electrode of a zinc-bromine battery in order to increase the performance and life expectancy of the battery.

These and other objects and advantages are achieved in a method of the present invention including the step of reversing the direction of the normal cycling current of the battery for one short cycle. The method of the present invention may also including lowering the pH of the electrolyte of the battery.

The method of the present invention for restoring electrochemical activity to an electrode of a battery, is useful when performed on battery which includes a predetermined number of electrochemical cells, an electrolyte, a first terminal electrode electrically coupled to the electrochemical cells, and a second terminal electrode electrically coupled to the electrochemical cell. Such a battery is charged so as to have a predetermined polarity, and is charged and discharged, or cycled. While charge flow during normal cycling of the battery occurs in two predetermined directions, such a battery is said to have a single cycling current which has a "so-called" single direction.

Specifically, the method of the present invention includes the steps of lowering the pH of the electrolyte in the battery, applying a voltage across the terminal electrodes so that the battery is charged to have a polarity opposite its polarity during normal cycling, and then discharging the battery.

Further objects and advantages of the present invention will become more apparent from the following detailed description of the preferred embodiment taken in combination with the accompanying drawings.

BRIEF DESCRIPTION OF THE DRAWINGS

FIG. 8 is a plot of the baseline cycle efficiency of another 1-kWH battery showing the efficiency of the battery over a number of cycles.

FIG. 9 is a plot of the baseline cycle efficiency of another 1-kWH battery showing the efficiency of the battery over a number of cycles.

FIG. 10 is a plot of the baseline cycle efficiency of another 1-kWH battery showing the efficiency of the battery over a number of cycles.

DESCRIPTION OF THE PREFERRED EMBODIMENT

Figure 1:
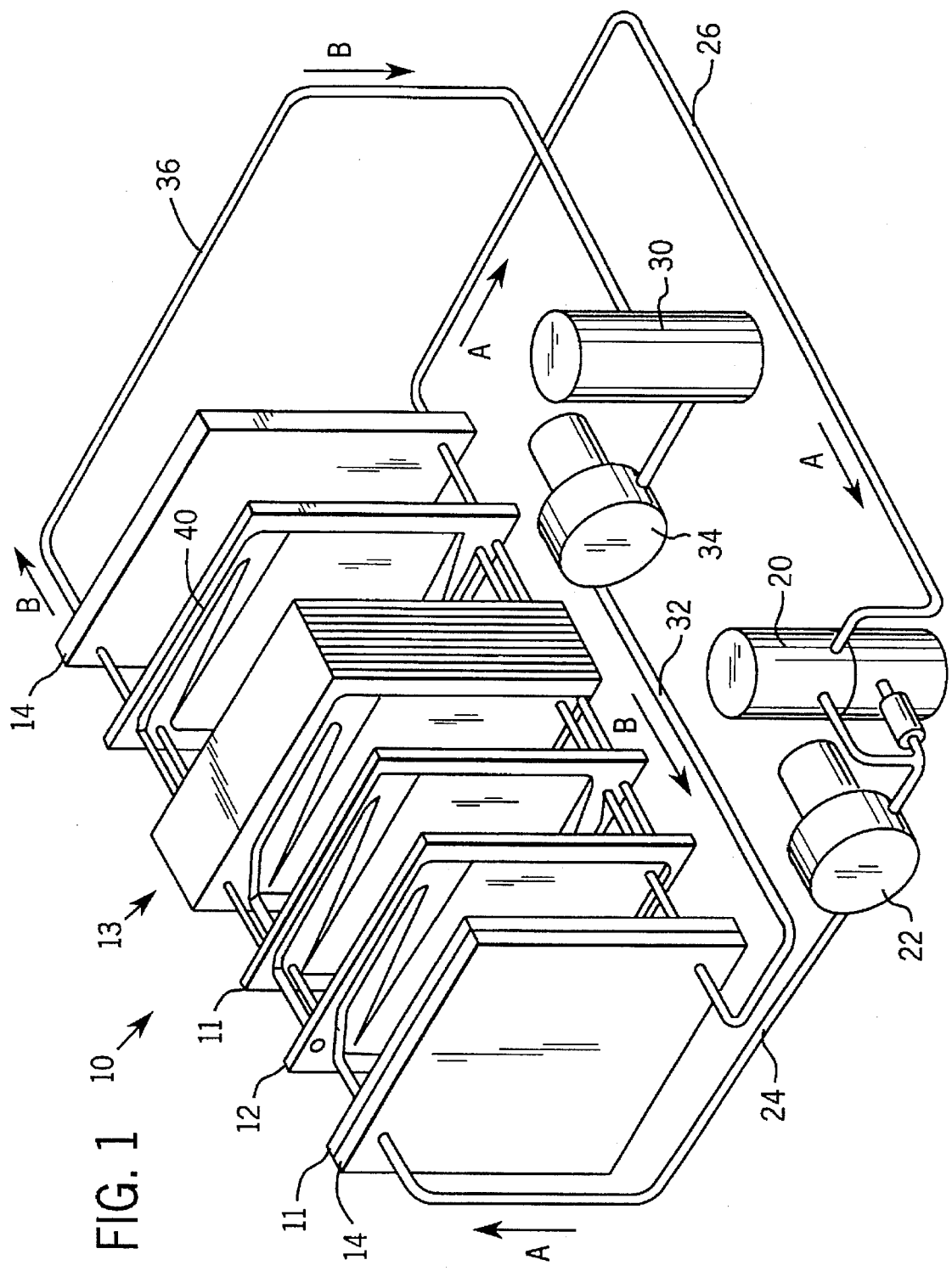
FIG. 1 is a schematic diagram of an exemplary embodiment of a stack of alternatively disposed zinc-bromine battery components, cooperating with electrolyte reservoirs.
Figure 2:
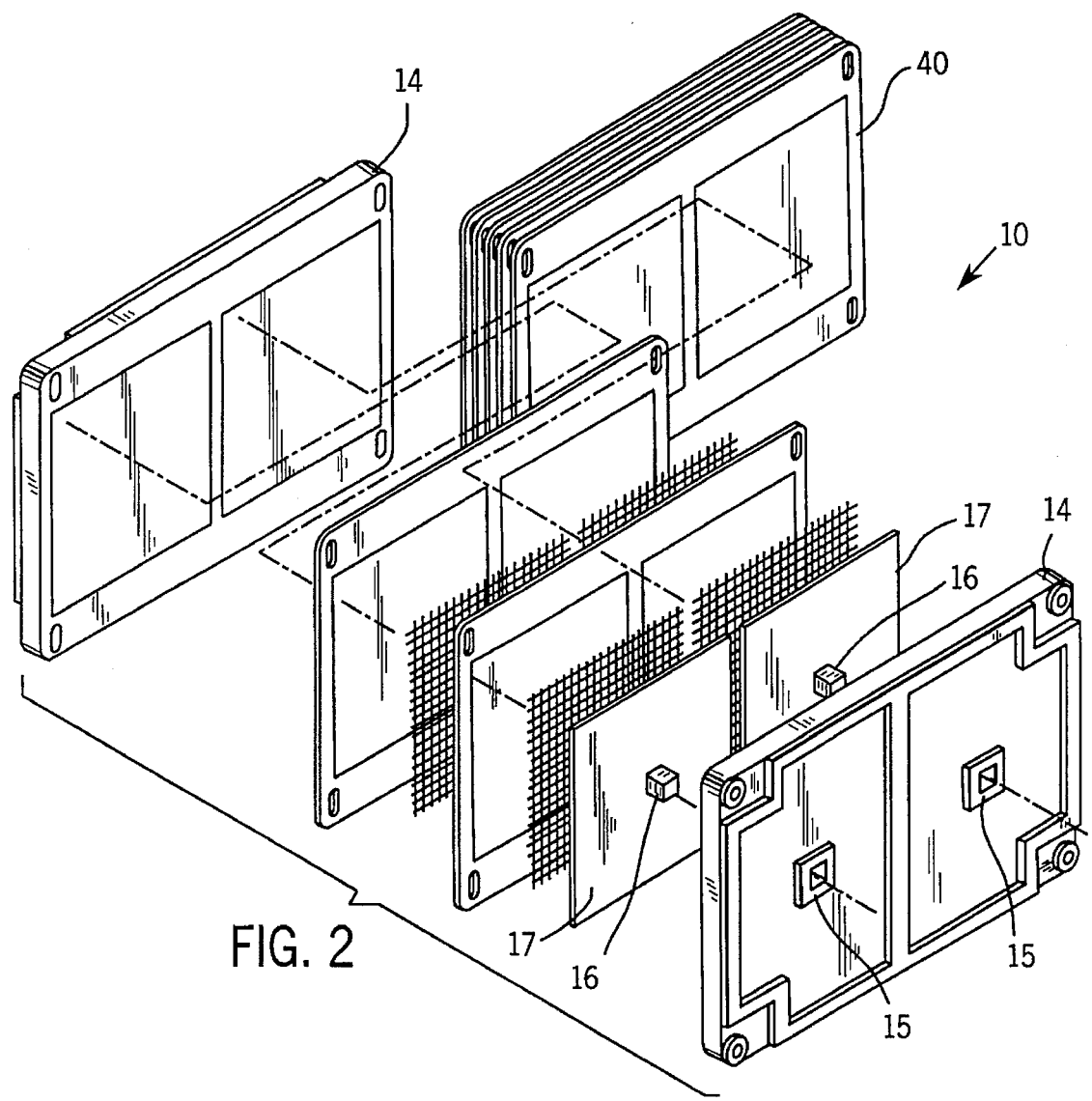
FIG. 2 is a perspective, exploded view of a stack of alternately disposed zinc-bromine battery components.

Referring more particularly to the drawings, a zinc-bromine battery, shown in an exploded view, is designated generally by the numeral 10 in FIG. 1. The zinc-bromine battery 10 includes a series of electrodes 11 and separators 12, welded together to form a stack 13 of electrochemical cells. Each battery 10 includes a predetermined number of electrodes 11 and separators 12 and, thus, a predetermined number of electrochemical cells. As best seen in FIG. 2, respective endblocks 14 are disposed at each end of the battery 10. The endblocks 14 each have a pair of openings 15 in which a pair of terminal studs 16 are positioned. The terminal studs 16 are electrically coupled to the battery's terminal electrodes 17 which may be mounted directly adjacent to the endblocks. The terminal studs provide a convenient means through which current may enter and leave the battery. Each terminal electrode is a current collector means capable of collecting current from, and distributing current to, the electrochemical cells of the battery. Although not shown, it should be understood that terminal electrodes are mounted on, or are adjacent to, each end block.

Referring back to FIG. 1, aqueous catholyte is stored in a catholyte reservoir 20. A catholyte pump 22 pumps aqueous catholyte through a common catholyte manifold 24 into each cathodic half cell as indicated by the arrows labeled A in FIG. 1, and back to the catholyte reservoir 20 through a catholyte return manifold 26.

Similarly, aqueous anolyte is stored in an anolyte reservoir 30 and pumped through an anolyte inlet manifold 32 by an anolyte pump 34. The anolyte flows through each anodic half-cell, one of which is disposed between each cathodic half-cell, and back to the anolyte reservoir 30 through an anolyte return manifold 36, as indicated by the arrows labeled B in FIG. 1. Thus, the electrochemical cells of the battery 10 are coupled in fluid flowing relation to the reservoirs 20 and 30 through the manifolds 24, 26, 32, and 36.

Each electrode and separator includes a thin sheet of electrode or separator material, respectively. These sheets are individually mounted in a nonconductive flow frame 40. Preferably, the nonconductive flow frame is made from a polymeric material such as polyethylene. Long, winding electrolyte inlet and outlet channel patterns are incorporated into one or both sides of the separator frame, the electrode frame, or both. The geometry of the channels, contributes to the electrical resistance required to reduce shunt currents which result in cell power losses. A leak-free internal seal is maintained along the channels and about the common perimeter of adjacent separators and electrodes.

Figure 3:
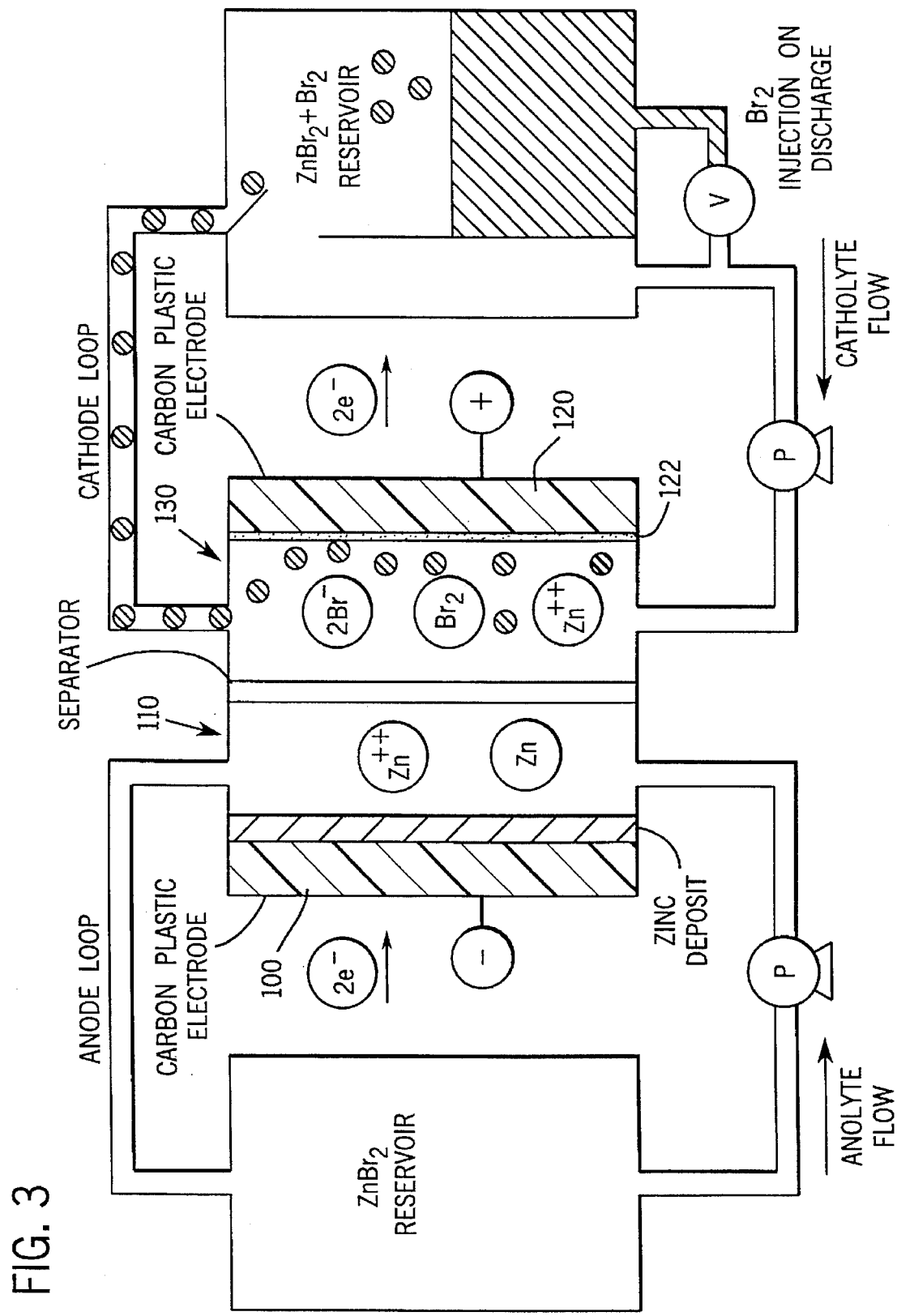
FIG. 3 is a schematic diagram of a zinc-bromine battery cell showing electrolyte flow to and from the reservoirs and through the battery.

As can be more readily seen by reference to the schematic representation of FIG. 3, during charge electron flow through the battery 10 results in zinc being plated on an anode or zinc electrode 100 which is in an anodic half-cell 110. During the same time bromine is evolved at a cathode or bromine electrode 120 which is in a cathodic half-cell 130. When the bromine is evolved it is immediately complexed with a quaternary salt and is removed from the battery to the catholyte reservoir 30. The complexed bromine or dense second phase is separated by gravity from bromine in the reservoir. Normally, on discharge, the complexed bromine or second phase is returned to the battery stack were bromine is reduced to bromide ion and zinc metal is oxidized to zinc ion.

Figure 4:
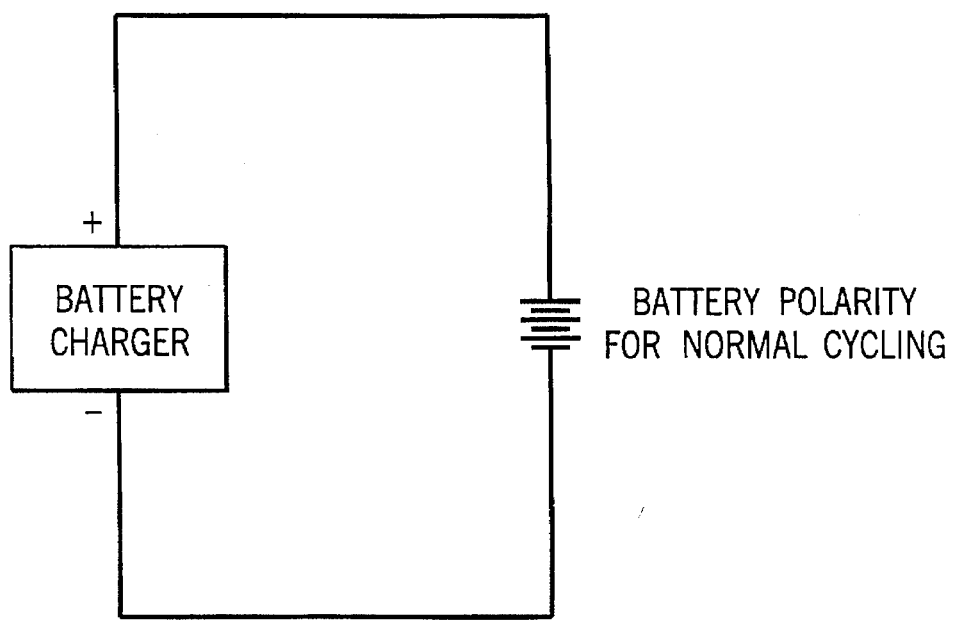
FIG. 4 is a circuit diagram showing the polarity of a battery while being charged for normal cycling.

It should be understood that during normal operation of the battery (see FIG. 4) it has a predetermined polarity and that the terminal studs in one endblock act as positive terminals and the terminal studs in the other endblock act as negative terminals. During discharge, charge flows from one endblock through an external load to the other endblock, from the positive terminals to the negative terminals. In order to charge the battery a voltage is coupled across the terminal studs, from endblock to endblock. A voltage is applied to the terminal studs such that a high potential is applied at the positive terminal stud and a low potential is applied to the negative terminal stud. As should be understood, charging of a battery is dependent on several factors. In a typical zinc-bromine battery, each cell is designed to have an open circuit voltage of 1.8 volts per cell, and charging systems for such a battery are designed to limit the charge voltage to about 2.1 volts per cell. Charging is carried out using a DC voltage source, which is typically obtained through an AC converter. Depending on the charge current, generally about 10 to 25 amps, applied during charging it takes about 2 to about 5 hours to fully charge a typical battery. Preferably, charging is done at a relatively low current and over a relatively long time. During charge, electric charges flow in a direction opposite to, or the reverse of, the flow of charges during discharge. While charges flow in opposite directions during charge and discharge of the battery, the battery can be characterized as having or said to have a "cycling current" which flows in a predetermined direction.

To improve battery efficiency, applied to the surface of cathode 120 is a carbon coating 122. As was discussed previously, any battery, including the battery 10, will undergo cycling, that is, the battery will be repeatedly charged and discharged. Over time, and after several cycles, the carbon coating 122, which is applied to the cathode 120 in order to increase the rate at which the bromine-bromide reaction occurs, will deteriorate. In particular, the active surface area of the carbon coating will decrease, and the carbon coating will oxidize.

It has been found that, by lowering the pH of the electrolyte and then reversing the direction of charge flow through the battery, or cycling current, for one short cycle, the performance of a zinc bromine battery may be enhanced.

The pH of the electrolyte is lowered by adding hydrobromic acid to the electrolyte flowing to the electrodes in a zinc bromine battery. Preferably, the pH of the electrolyte is lowered to about 1.0 from the normal pH of the electrolyte which is about 3.0 to about 3.5. Preferably, the hydrobromic acid should have a pH of less than 1 and a density of about 1.49 g/ml. For every liter of electrolyte in a battery, two milliliters of hydrobromic acid is added to it. For example, in a 33 kWH battery having an overall capacity of about 100 to about 150 liters of electrolyte, about 200 to about 300 ml of hydrobromic acid must be used to lower the pH to an appropriate level.

The direction of charge flow through the battery is reversed by operating the battery with a polarity opposite, or reverse of, its normal or regular polarity. In particular, the method of the present invention involves reversing the polarity of a zinc-bromine battery after it has been charged and discharged many times. After undergoing several cycles, perhaps on the order of 300 cycles, a zinc-bromine battery is prepared for reconditioning by "stripping" the battery. Stripping is the process of draining a battery of the voltage, or energy, stored therein. Normally a zinc-bromine battery is discharged to 1.0 volts per cell. The battery is then stripped in order to remove any remaining energy in the battery. Stripping is accomplished by electrically coupling a resistor across the terminals of the battery.

Figure 5:
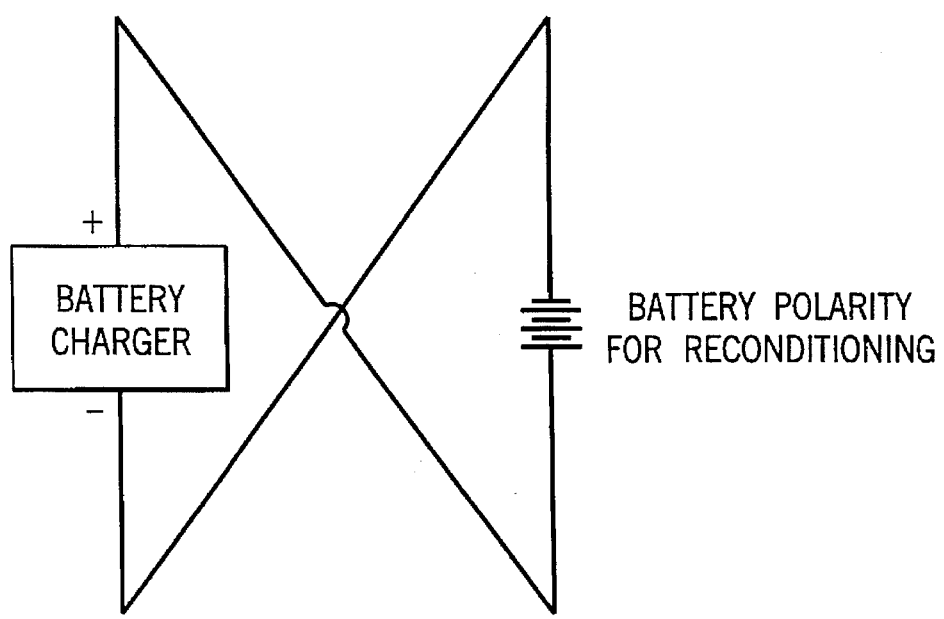
FIG. 5 is a circuit diagram showing the polarity of a battery while being charged during reconditioning.

Once all energy from the battery is drained, the battery is charged so that zinc is plated on the bromine electrode 120, on top of the carbon coating thereof, and bromine is evolved at the zinc electrode 100. The battery is charged such that is has a polarity as shown in FIG. 5. The battery is charged for about 135 minutes in order to achieve a zinc loading of about 45 mAh/cm² on the bromine electrode 120. The battery is then discharged by appropriately coupling it to a load. The battery may or may not then be drained of all energy by stripping. Reconditioning is then complete. Then the battery is recharged by plating zinc on the zinc electrode and evolving bromine on the bromine electrode and cycled as normal until another reconditioning cycle is conducted.

The present invention was discovered while testing the safety of zinc-bromine batteries. It was believed that charging a battery such that it had a polarity opposite its normal polarity would damage it. However, it was found that battery performance actually improved. Initial tests were conducted without lowering the pH of the battery. Thus, reconditioning may be accomplished without lowering the pH of the electrolyte. It is believed that reconditioning may be accomplished by reverse charging the battery for as little as about 20 to about 30 minutes in order to achieve a zinc loading of about 5 mAh/cm² on the bromine electrode 120 and then discharging the battery.

The result of carrying out reconditioning, including lowering the pH, on four, eight-cell batteries is shown in Table 1.

TABLE 1

EFFECT OF ELECTRODE RECONDITIONING

| Battery Number | Cycle | Coulombic Efficiency | Voltaic Efficiency | Energy Efficiency |
|---|---|---|---|---|
| V1-72 | #465 | 82.6% | 78.1% | 64.5% |
|  | #467 | 85.4% | 80.4% | 68.7% |
| V1-76 | #341 | 79.3% | 71.8% | 57.0% |
|  | #343 | 84.9% | 78.0% | 66.2% |
| V1-77 | #350 | 86.4% | 81.4% | 70.3% |
|  | #355 | 90.0% | 83.3% | 75.0% |
| V1-79 | #360 | 90.4% | 82.5% | 74.6% |
|  | #361 | 90.9% | 83.3% | 75.7% |

As can be seen from Table 1, immediately following the discharge of a battery, running a short cycle with the direction of the current reversed was found to improve the energy efficiency of poorly performing batteries. The process was found to be more effective if carried out before the energy efficiency declined by about 10% from the peak value. FIGS. 6 through 10 show how reconditioning improves the efficiency and life expectancy of zinc-bromine batteries.

Figure 6:
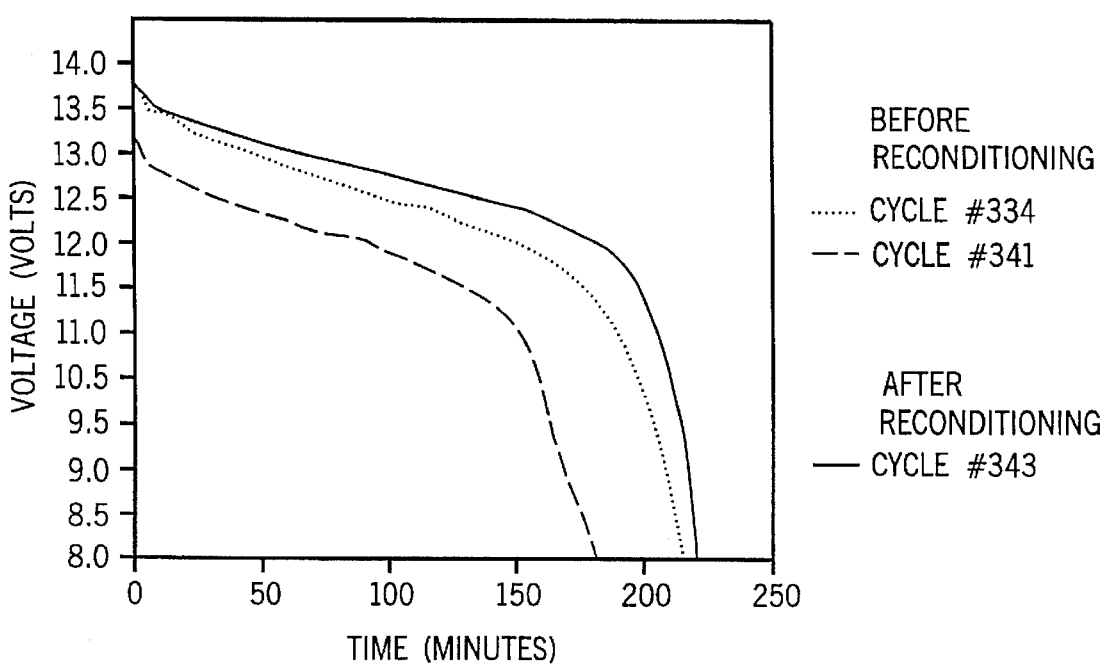
FIG. 6 is a plot of the voltage profile of a 1-kWH battery showing the output voltage of the battery over time.

FIG. 6 shows a voltage profile of a 1 KWh battery before and after electrode reconditioning. In particular, it was found that after reconditioning, a battery was able to output a higher voltage for a greater time period than before reconditioning.

Of course even when reconditioned, a battery has a finite useful life and will eventually fail to function properly. Failure of a zinc-bromine battery is usually associated with a rapid increase in polarization. As should be understood, the polarization for a zinc-bromine battery may be determined using the following equation:

$$\text{Polarization} = OCV - V_{load} - I*R;$$

Where $V_{load}$ is the battery voltage during discharge, I is the discharge current, OCV is the open circuit voltage of the battery, and R is the internal resistance of the battery.

During discharge of a zinc-bromine battery measurements of $V_{load}$, I, OCV, and R are taken about 20 to 30 minutes into the discharge of the battery and the polarization is determined using the above equation. The reconditioning process has been observed to significantly lower polarization and improve efficiencies.

Figure 7:
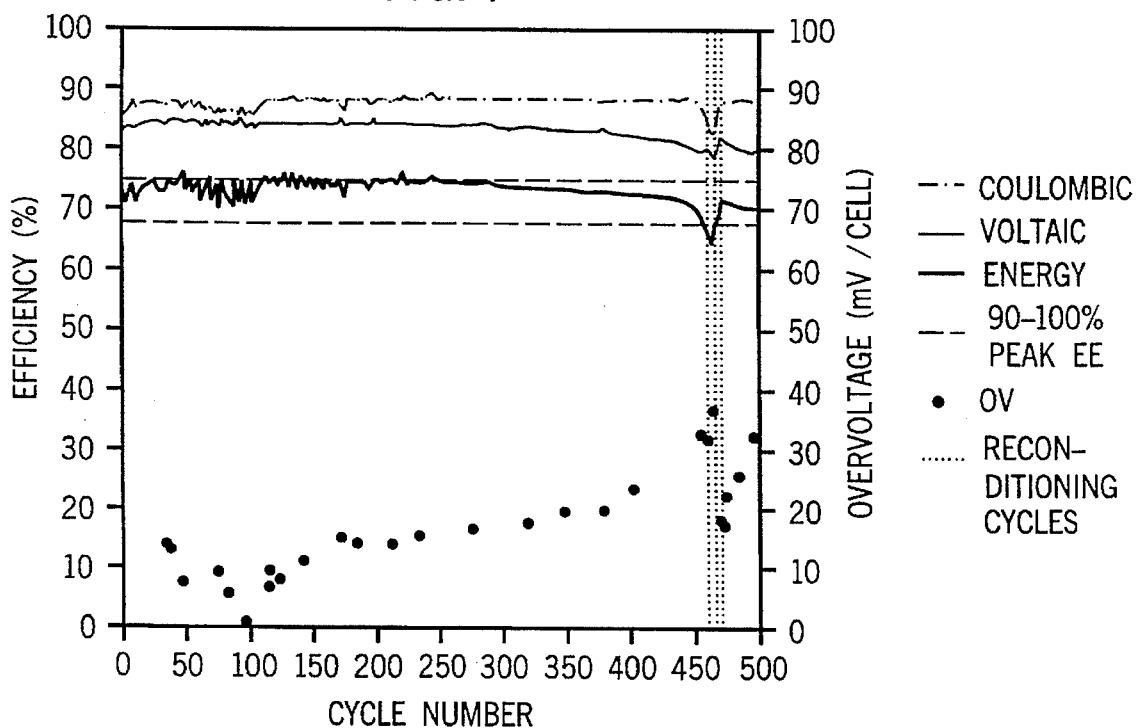
FIG. 7 is a plot of the baseline cycle efficiency of a 1-kWH battery showing the efficiency of the battery over a number of cycles.

FIG. 7 shows a plot of the voltaic, coulombic, and energy efficiencies of a 1 KWh battery. As can be seen, each of the efficiencies gradually decreases. After several reconditioning cycles the efficiencies increase. FIG. 7 shows the results of reconditioning after the efficiency of the battery has dropped by more than ten percent. As can be seen by reference to FIGS. 8 and 9, when reconditioning is carried out before the efficiency of a battery has dropped by 10%, reconditioning results in more substantial improvement of the battery's performance.

While the exact mechanism by which the process of the present invention causes restoration of the battery performance is not fully understood, it is believed that the process either increases the effective active surface area of the carbon coating on the electrode surface, or strips some of the oxygen from the coating's surface, or both.

After reconditioning, the battery is put back to normal use reconditioning. A normal pH level is restored due to hydrogen generation which occurs during discharge in normal cycling.

In addition to reducing polarization, electrode reconditioning carried out according to the teachings of the present invention may also be used in place of stripping a zinc-bromine battery.

Immediately following the discharge of a battery, running a short cycle with the direction of the current reversed was found to eliminate the need for stripping. In addition, the energy efficiency of a battery so conditioned was found to increase by about 5% when subsequently charged and put into use.

While the invention has been herein shown and described in what is perceived to be the most practical and preferred embodiment, it should be recognized that departures may be made therefrom within the scope of the invention which is not to be limited to the illustrative details disclosed.

What is claimed is:

1. A method of restoring electrochemical activity to a zinc-bromine battery which includes one or more bromine electrodes and an electrolyte, the method comprising the steps of:

reverse charging the battery to achieve a zinc loading of at least about 5 mAh/cm$^2$ on each of the bromine electrodes; and optionally lowering the pH of the electrolyte before reverse charging the battery.

2. A method of restoring electrochemical activity to a zinc-bromine battery as claimed in claim 1, the method further comprising the step of discharging the reverse charged battery.

3. A method of restoring electrochemical activity to a zinc-bromine battery as claimed in claim 1, the method further comprising the step of reducing the output voltage of the battery to essentially zero before reverse charging the battery.

4. A method of restoring electrochemical activity to a zinc, zinc-halogen battery which includes one or more cathodes and an electrolyte, the method comprising the steps of:

reverse charging the battery to achieve a metal loading of about 5 mAh/cm$^2$ on each of the cathodes; and optionally lowering the pH of the electrolyte before reverse charging the battery.

5. A method of restoring electrochemical activity to a metal-halogen battery as claimed in claim 4, the method further comprising the step of reducing the output voltage of the battery to essentially zero before reverse charging the battery.

6. A method of restoring electrochemical activity to a zinc-halogen battery which includes one or more electrochemical cells and one or more cathodes, the method comprising the steps of:

reverse charging the battery to achieve a charge voltage of about −1.8 volts or less per electrochemical cell and achieve a metal loading on each cathode; and optionally lowering the pH of the electrolyte before reverse charging the battery.

7. A method of restoring electrochemical activity to zinc-halogen battery as claimed in claim 5, the method further comprising the step of reducing the output voltage of the battery to essentially zero before reverse charging the battery.

8. A method of restoring electrochemical activity to a zinc-bromine battery which includes one or more bromine electrodes and an electrolyte, the method comprising the steps of:

reverse charging the battery to achieve a zinc loading of at least about 5 mAh/cm$^2$ on each of the bromine electrodes; and lowering the pH of the electrolyte before reverse charging the battery.

9. A method of restoring electrochemical activity to a zinc-bromine battery as claimed in claim 8, wherein the pH of the electrolyte in the battery is lowered to about 1.0.

10. A method of restoring electrochemical activity to a zinc-halogen battery which includes one or more cathodes and an electrolyte, the method comprising the steps of:

reverse charging the battery to achieve a metal loading of about 5 mAh/cm$^2$ on each of the cathodes; and lowering the pH of the electrolyte before reverse charging the battery.

11. A method of restoring electrochemical activity to a zinc-halogen battery which includes one or more electrochemical cells and one or more cathodes, the method comprising the steps of:

reverse charging the battery to achieve a charge voltage of about −1.8 volts or less per electrochemical cell and achieve a metal loading on each cathode; and lowering the pH of the electrolyte before reverse charging the battery.

12. A method of restoring electrochemical activity to a zinc-halogen battery which includes one or more electrochemical cells and one or more cathodes, the method comprising the steps of:

reducing the output voltage of the battery to essentially zero;

reverse charging the battery to achieve a charge voltage of about −1.8 volts or less per electrochemical cell and achieve a metal loading on each cathode; and discharging the battery.

* * * * *